US012600841B2

(12) United States Patent
Tian et al.

(10) Patent No.: US 12,600,841 B2
(45) Date of Patent: Apr. 14, 2026

(54) BIODEGRADABLE COMPOSITION AND METHOD OF PREPARATION THEREOF

(71) Applicant: The University of Chicago, Chicago, IL (US)

(72) Inventors: Bozhi Tian, Chicago, IL (US); Herbert Wang, Chicago, IL (US); Yin Fang, Chicago, IL (US); Yiliang Lin, Chicago, IL (US)

(73) Assignee: The University of Chicago, Chicago, IL (US)

( * ) Notice: Subject to any disclaimer, the term of this patent is extended or adjusted under 35 U.S.C. 154(b) by 894 days.

(21) Appl. No.: 17/788,983

(22) PCT Filed: Dec. 18, 2020

(86) PCT No.: PCT/US2020/066097
§ 371 (c)(1),
(2) Date: Jun. 24, 2022

(87) PCT Pub. No.: WO2021/138089
PCT Pub. Date: Jul. 8, 2021

(65) Prior Publication Data
US 2023/0048814 A1 Feb. 16, 2023

Related U.S. Application Data

(60) Provisional application No. 62/954,772, filed on Dec. 30, 2019.

(51) Int. Cl.
C08L 3/02 (2006.01)
B65D 65/46 (2006.01)
(Continued)

(52) U.S. Cl.
CPC .............. *C08L 3/02* (2013.01); *B65D 65/466* (2013.01); *C08J 3/075* (2013.01); *C08J 7/04* (2013.01);
(Continued)

(58) Field of Classification Search
None
See application file for complete search history.

(56) References Cited

U.S. PATENT DOCUMENTS

| | | | | |
|---|---|---|---|---|
| 2,330,314 A | * | 9/1943 | Schwartz | D04H 1/587 |
| | | | | 524/401 |
| 2012/0144611 A1 | * | 6/2012 | Baker | D04H 1/5412 |
| | | | | 15/104.93 |

FOREIGN PATENT DOCUMENTS

| | | | |
|---|---|---|---|
| CN | 102978916 A | | 3/2013 |
| CN | 104562768 A | * | 4/2015 |
| CN | 109401671 A | | 3/2019 |

OTHER PUBLICATIONS

CN-104562768-A, English translation (Year: 2015).*
(Continued)

*Primary Examiner* — Stefanie J Cohen
(74) *Attorney, Agent, or Firm* — McDonnell Boehnen Hulbert & Berghoff LLP

(57) ABSTRACT

A composition and method directed to the formation of a biodegradable composition with enhanced mechanical properties is provided. The composition includes starch in an amount from 15-45%, chitosan in an amount ranging from 1-50 wt %, polyacrylamide in an amount ranging from 1-10 wt %, and water in an amount ranging from 25-85 wt %. The composition can be provided for food packaging or otherwise as a protective material.

20 Claims, 10 Drawing Sheets

(51) Int. Cl.
| | |
|---|---|
| *C08J 3/075* | (2006.01) |
| *C08J 7/04* | (2020.01) |
| *C08L 5/08* | (2006.01) |
| *C08L 33/26* | (2006.01) |

(52) U.S. Cl.
CPC ................. *C08L 5/08* (2013.01); *C08L 33/26* (2013.01); *C08J 2303/02* (2013.01); *C08J 2305/08* (2013.01); *C08J 2333/26* (2013.01); *C08L 2201/06* (2013.01); *C08L 2205/03* (2013.01)

(56) References Cited

OTHER PUBLICATIONS

Form PCT/ISA/220, Notification of Transmittal of the International Search Report and the Written Opinion of the International Searching Authority, or the Declaration, issued in the International Application No. PCT/US2020/066097 dated Mar. 16, 2021.
Form PCT/ISA/237, Written Opinion of the International Searching Authority, issued in the International Application No. PCT/US2020/066097 dated Mar. 16, 2021.

\* cited by examiner

Unwrap

Wrap

BIODEGRADABLE COMPOSITION AND METHOD OF PREPARATION THEREOF

CROSS-REFERENCE TO RELATED APPLICATIONS

This application is a section 371 U.S. national phase of PCT/US2020/066097, filed Dec. 18, 2020, which claims the benefit of priority of U.S. Provisional Patent Application No. 62/954,772, filed Dec. 30, 2019, both which are hereby incorporated by reference in its entirety.

FIELD

A composition and method of preparation is disclosed. The composition can be advantageously used for food packaging and possesses desirable mechanical properties, and may have enhanced biodegradability.

BACKGROUND

Food waste and plastic pollution from food packaging are both serious problems currently facing society. Potential remedies to both of these problems have a nexus in food packaging. Inadequate food packaging fails to prevent premature food degradation, leading to waste of the food and often the packaging material. The packaging material itself, even if the food is successfully protected, often is not recycled or cannot be recycled. Accordingly, the development of new food packaging materials with a focus on sustainability, functionality, and biodegradability is an important goal. Next-generation food packaging materials need to exhibit effective barriers between the environment and interior contents while still displaying the ability to degrade biologically under natural conditions after disposal. Thus, the material must display excellent mechanical properties while still being susceptible to medium-term bacterial or fungal degradation.

However, the simultaneously achieving robust mechanical properties and biodegradability is difficult, as strong covalent bonding within a material may make it impervious to biological breakdown. Accordingly, there is a need for improved biodegradable food packing material.

SUMMARY

Specifically, materials that exhibit excellent toughness and energy dissipation, among other mechanical properties, are highly desired for packaging. An alternative technique is the use of compatible biological polymers which serve to synergistically enhance mechanical properties while maintaining biodegradability. Specific polymers of interest are polysaccharides. Polysaccharides are plentiful and naturally occur in many forms with diverse properties, and have varying degrees of resistance to biological degradation. Accordingly, it was theorized that particular combinations of polysaccharides, potentially in combination with chosen polymers and other additives, may result in materials with exceptional mechanical properties while maintaining biodegradability. Such a material would yield improved packaging materials, among other envisaged applications, to enhance food transport and storage while minimizing environmental damage.

It was surprisingly found that chitosan, usually only able to be evenly dispersed in acid, has an interaction with starch which forms new bonds and allows the chitosan to evenly "dissolve" in the gel. This interaction influences the mechanical properties of the gel. When both stretched and compressed, it was discovered found that the mechanical properties better than those of each individual particle. In addition, the material exhibits energy dissipation properties and rate dependence properties, a finding that makes it a suitable candidate as a mechanical barrier for a food packaging material. To fully test the application of this material for food packaging, the extent of biodegradability and antimicrobial properties was observed.

An aspect of the present disclosure relates to a composition comprising starch in an amount ranging from 15-45 wt %; chitosan in an amount ranging from 1-50 wt %; polyacrylamide in an amount ranging from 1-10 wt %; and water in an amount ranging from 25-85 wt %.

Another aspect of the present disclosure relates to a method of making a composition, comprising admixing 15-45 wt % starch with 25-85 wt % water to form a first mixture; admixing 1-10 wt % acrylamide, an initiator, and a crosslinker to the first mixture to form a second mixture; admixing 1-20 wt % chitosan to the second mixture to form a suspension; stirring the suspension for at least 24 hours at room temperature; adding an accelerator to the suspension and stirring the suspension for 2-4 minutes to form a partially polymerized hydrogel, wherein the amount of accelerator is sufficient to accelerate polymerization of the suspension; and casting the hydrogel and allowing the hydrogel to fully polymerize.

Another aspect of the present disclosure relates to a composition made by the method as otherwise described herein.

Another aspect of the present disclosure relates to a method of packaging, comprising: providing the composition as described herein; and forming a packaging material comprising the composition.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Figure 1:
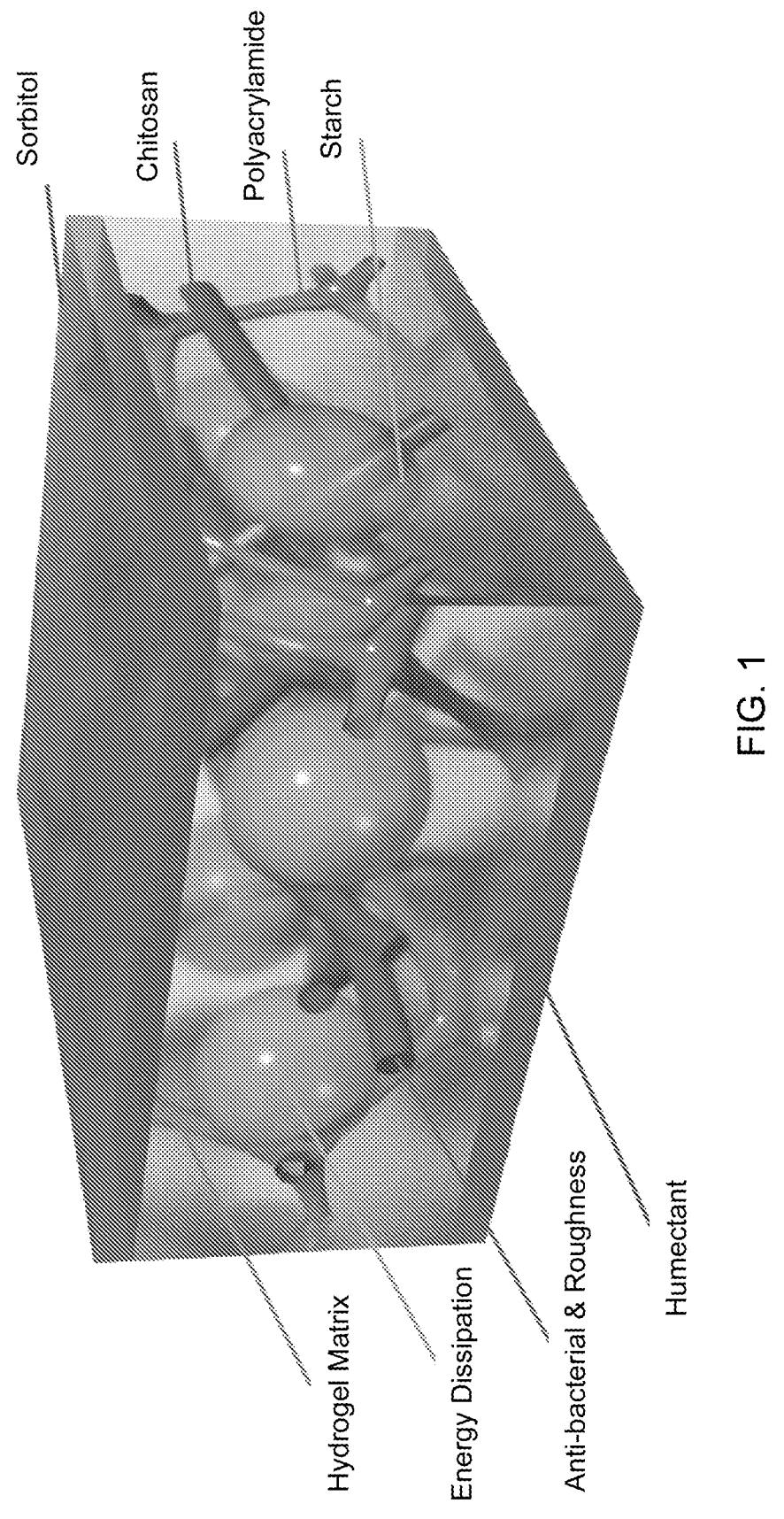
FIG. 1 illustrates an example composition according to the present disclosure wherein starch granules are provided with chitosan filaments.
Figure 2:
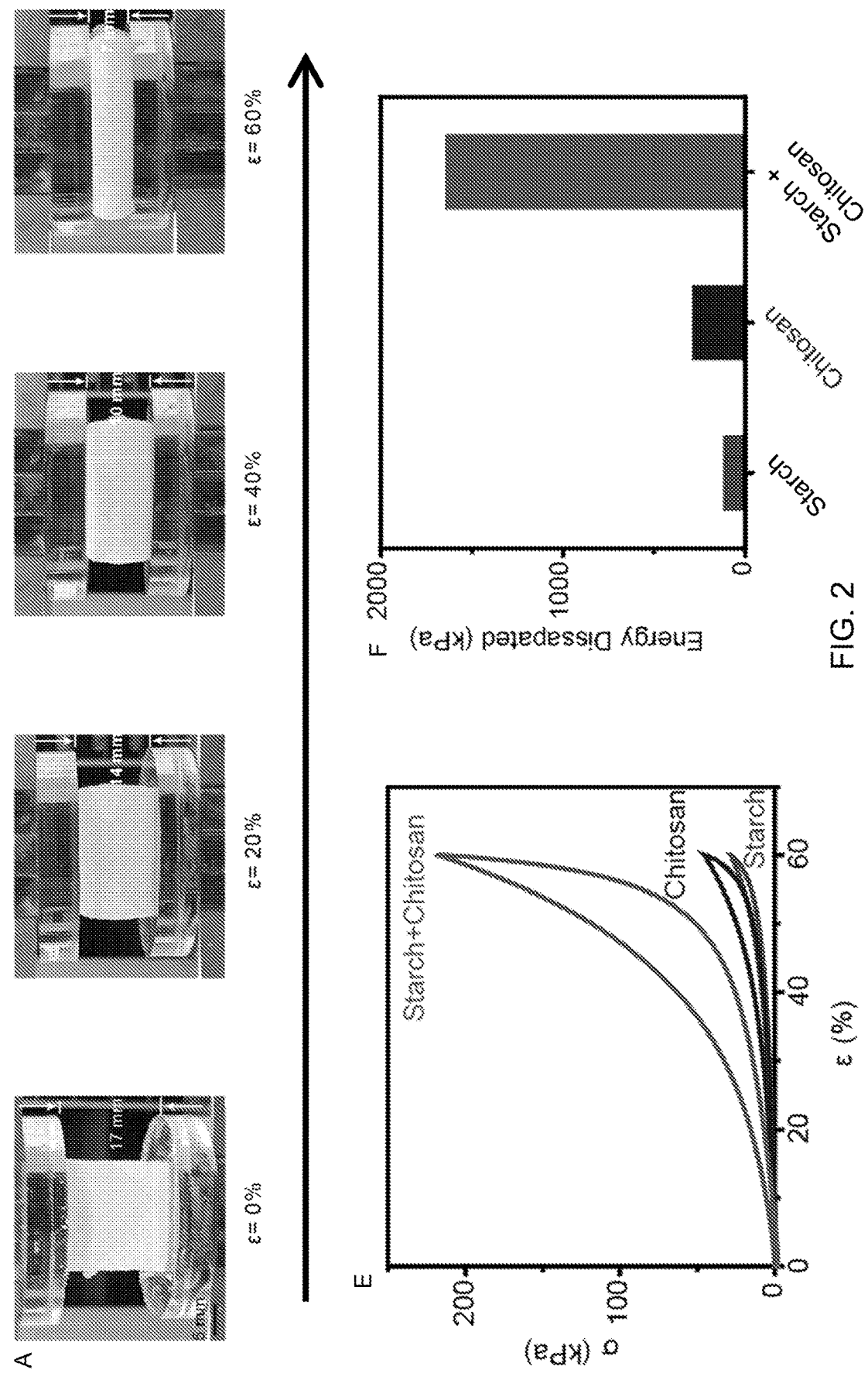
FIG. 2 illustrates the compression testing (Panels A-D) as well as the results (Panels E and F) of example embodiments.
Figure 3:
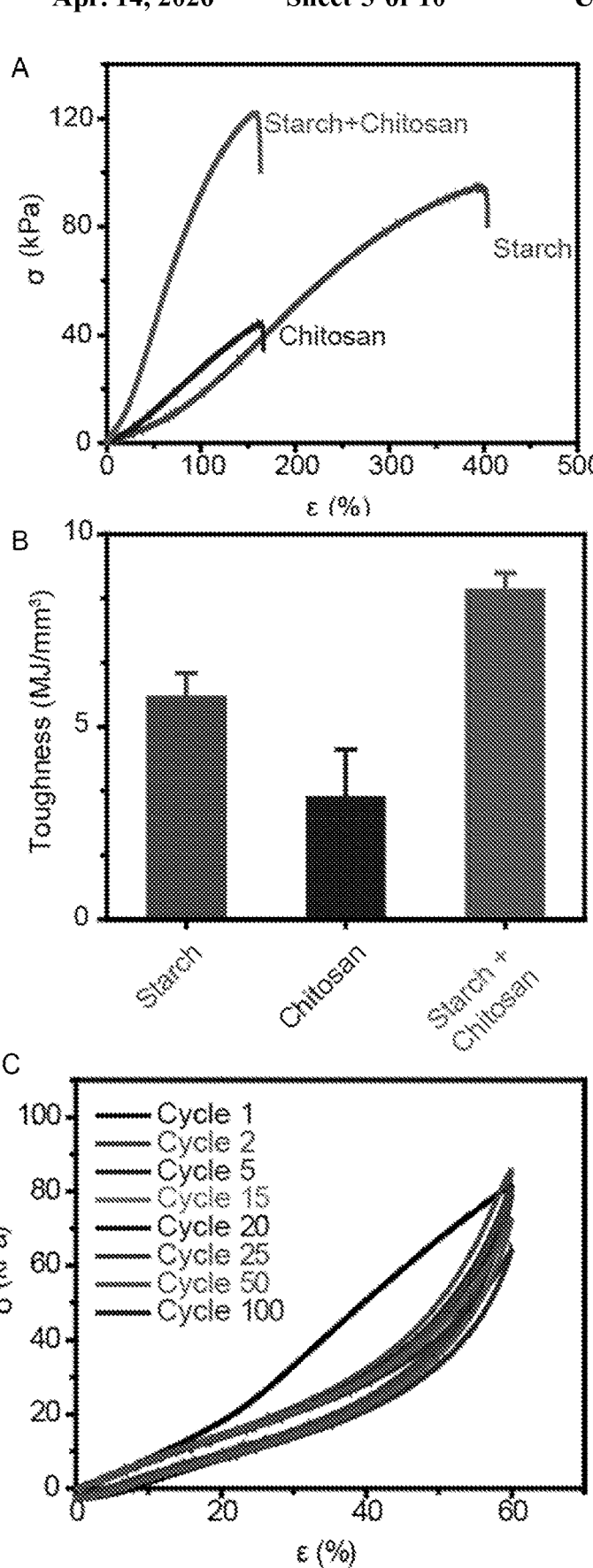
FIG. 3, Panels A-C illustrate further mechanical properties determined for an example embodiment.
Figure 4:
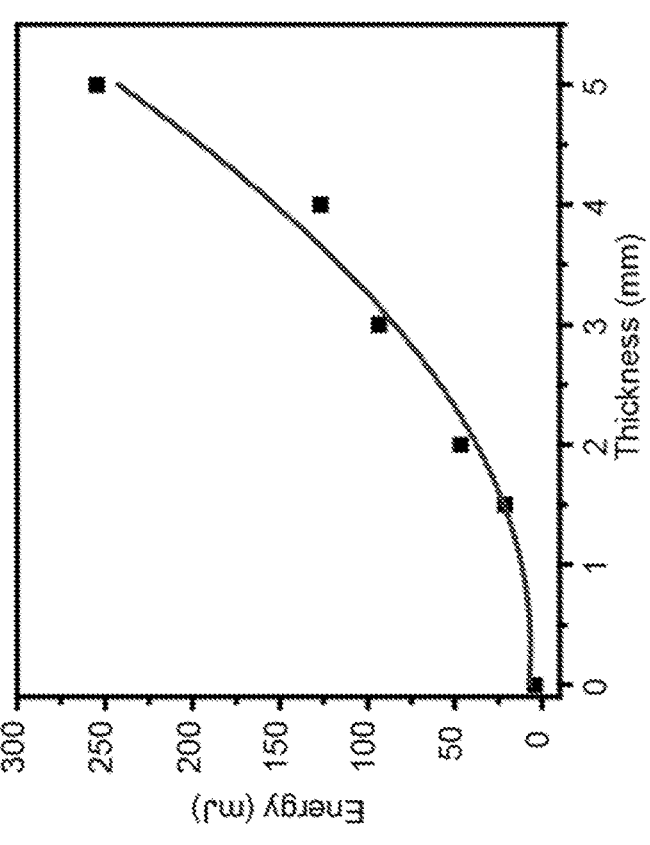
FIG. 4 illustrates the results of drop testings performed with example embodiments of different thicknesses.
Figure 4:
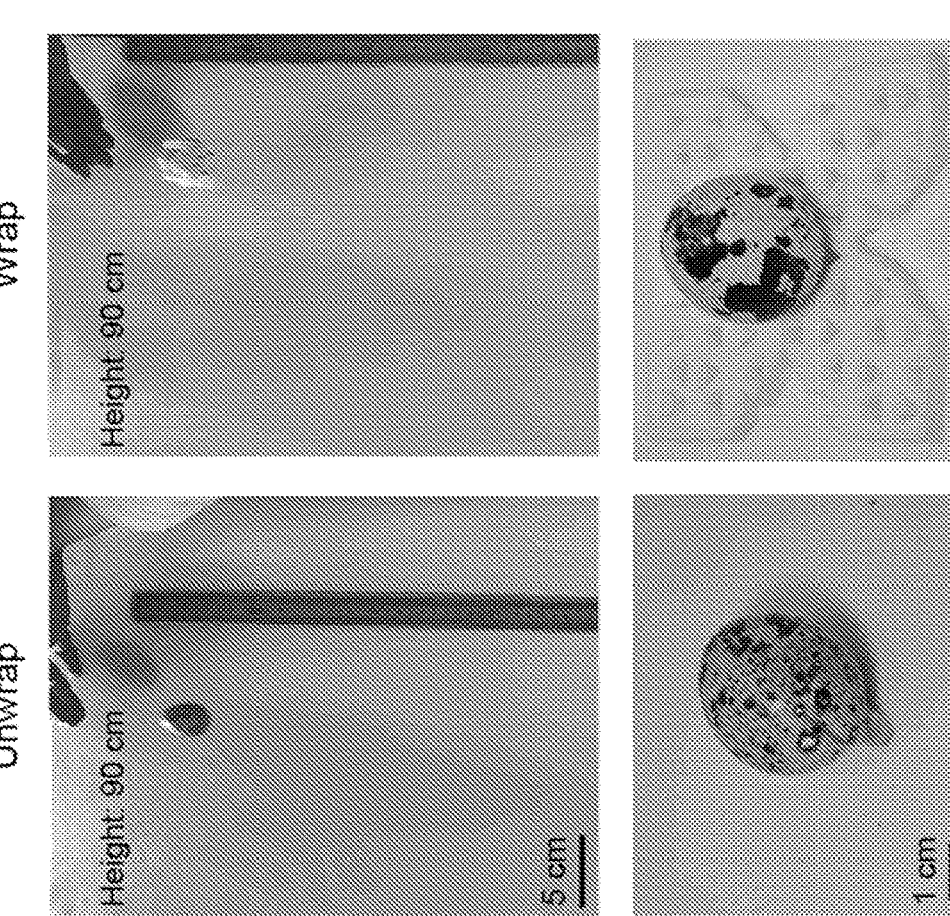
Figure 5:
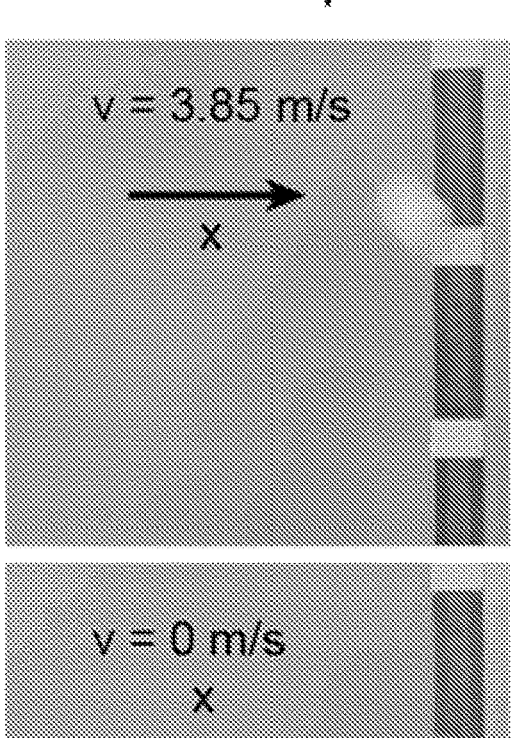
FIG. 5 illustrates the experimental schematic of trebuchet impact testing of a material according to an example embodiment.
Figure 5:
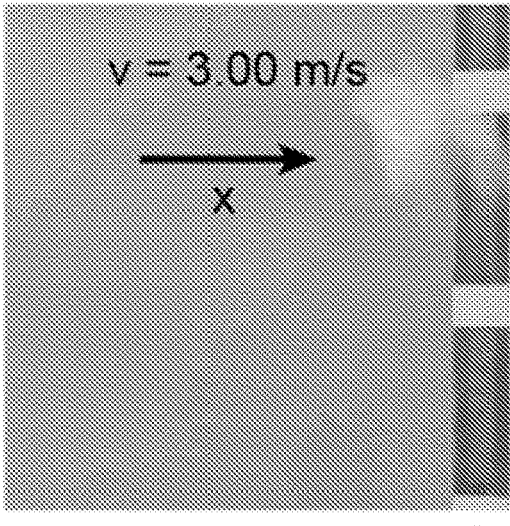
Figure 5:
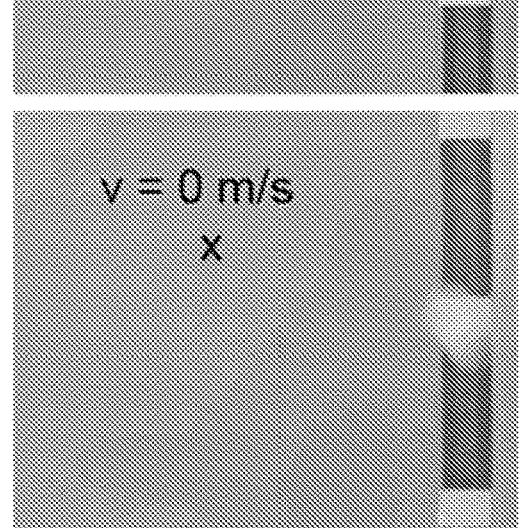
Figure 5:
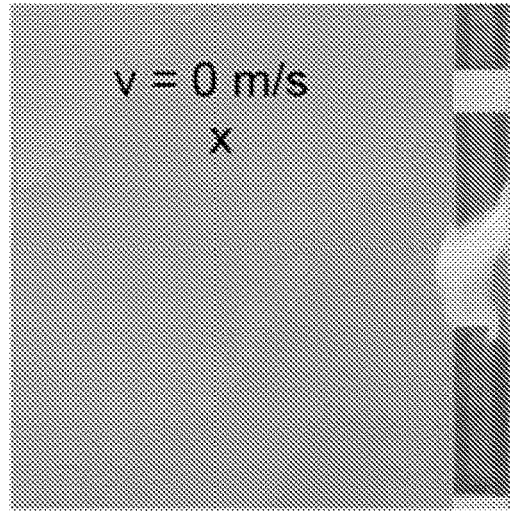
Figure 5:
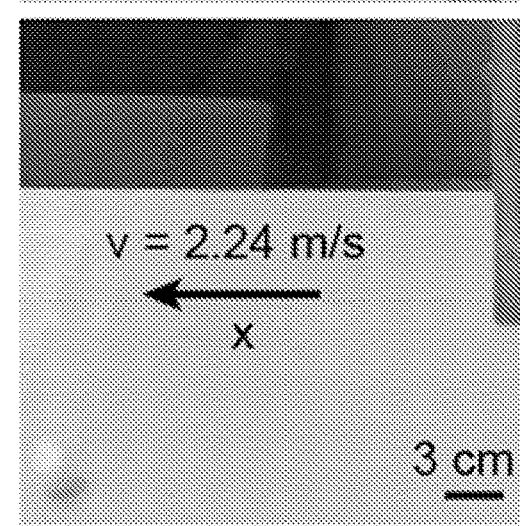
Figure 5:
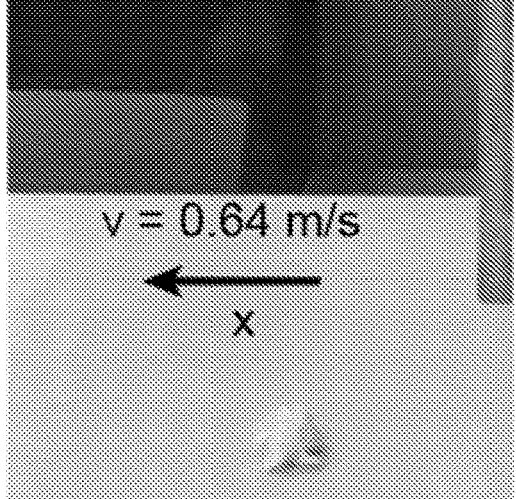
Figure 6:
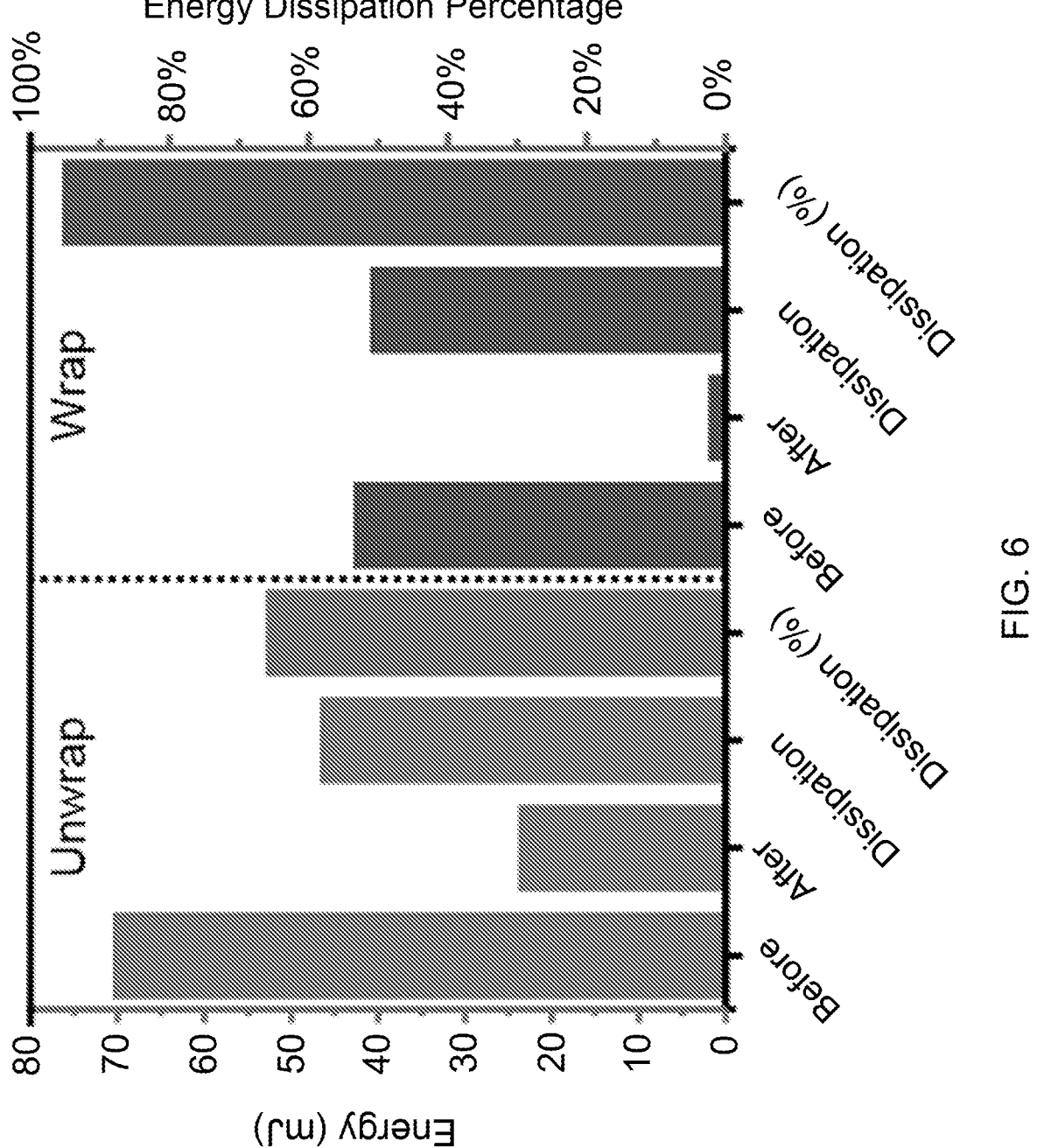
FIG. 6 illustrates the results of trebuchet impact testing of a material according to an example embodiment.
Figure 7:
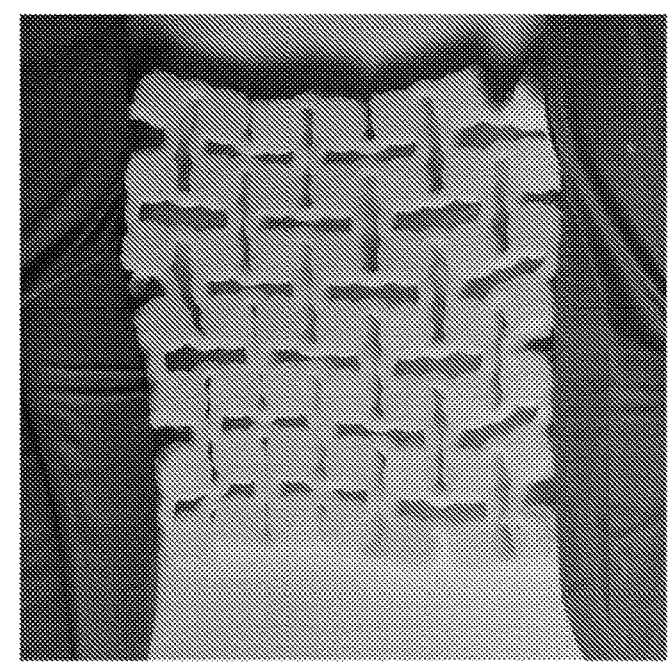
FIG. 7 illustrates potential shapes for molding, and their response to compression, according to an example embodiment.
Figure 7:
Figure 7:
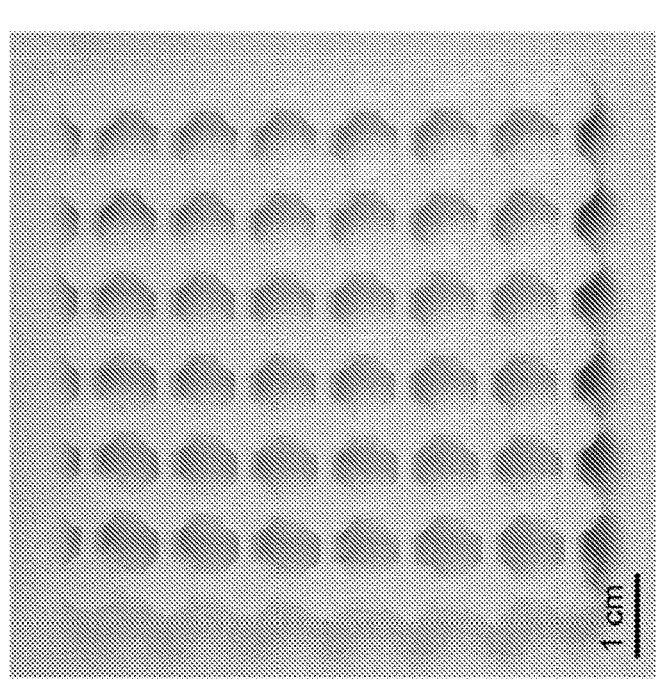
Figure 8:
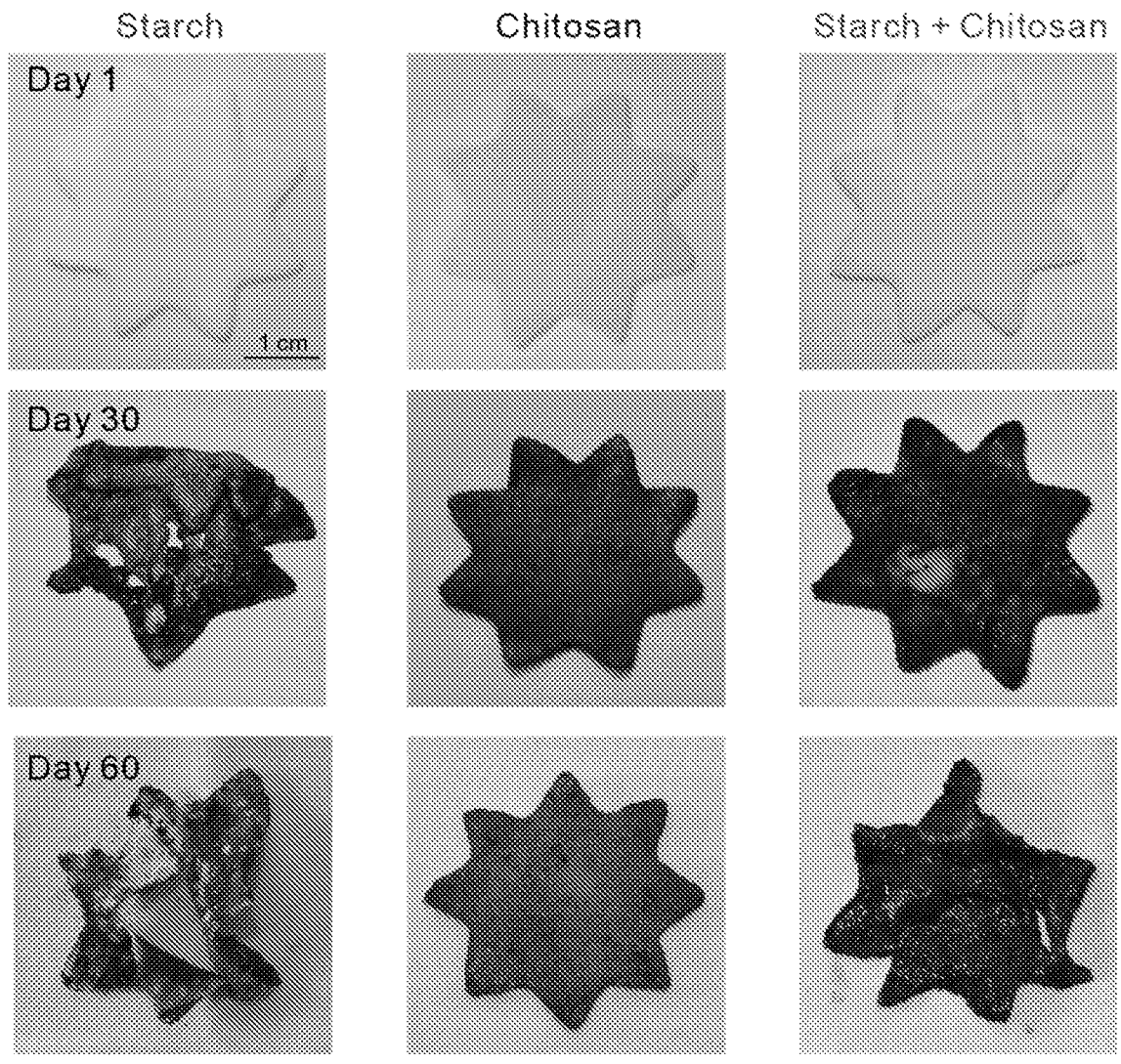
FIG. 8 illustrates biodegradability test results according to an example embodiment.
Figure 9:
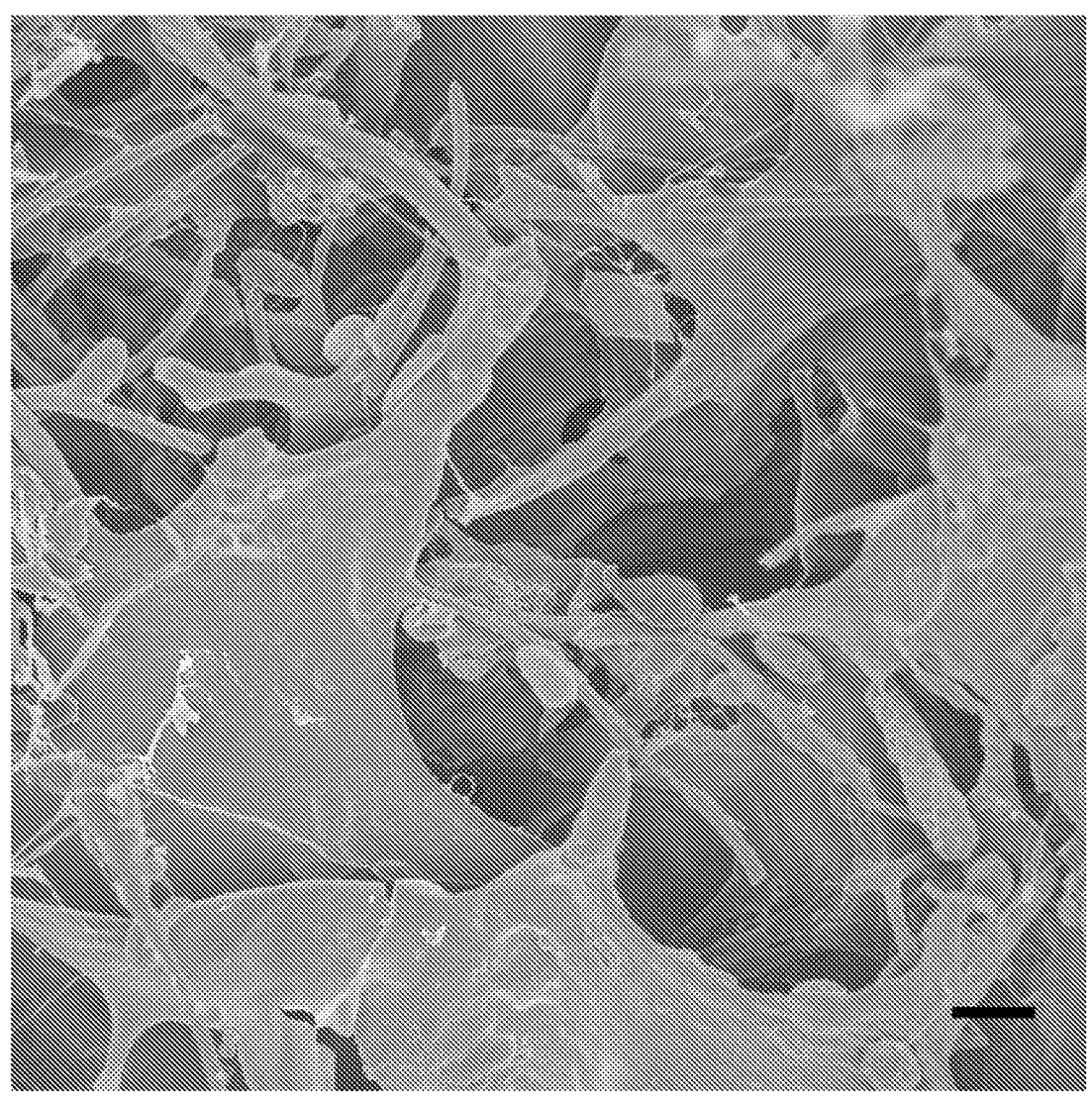
FIG. 9 depicts a bacterial SEM image according to an example embodiment.
Figure 10:
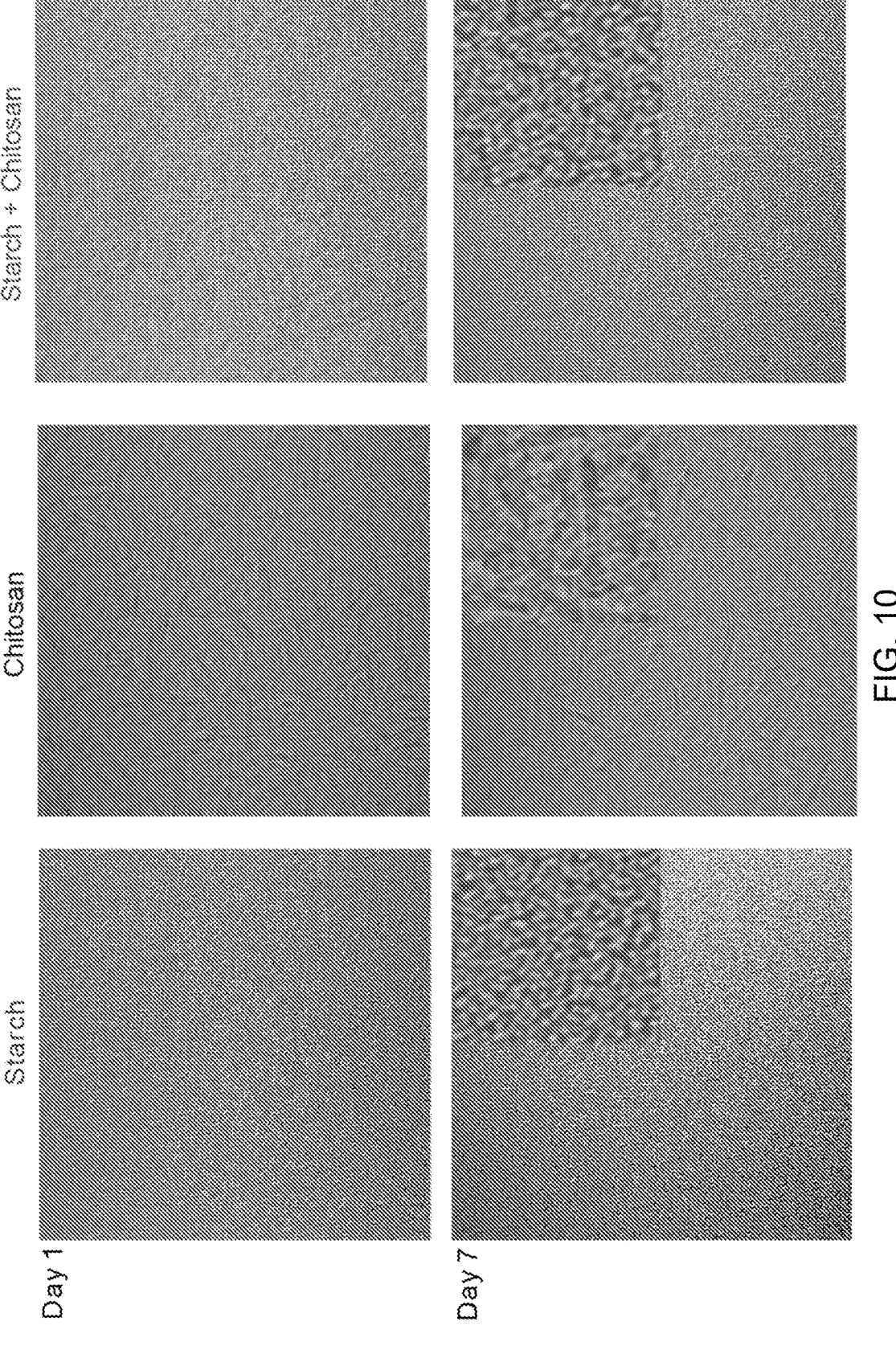
FIG. 10 depicts the results of the solution X-ray experiment according to an example embodiment.

Examples of methods and systems are described herein. It should be understood that the words "exemplary," "example," and "illustrative," are used herein to mean "serving as an example, instance, or illustration." Any embodiment or feature described herein as "exemplary," "example," or "illustrative," is not necessarily to be construed as preferred or advantageous over other embodiments or features. Further, the exemplary embodiments described herein are not meant to be limiting. It will be readily understood that certain aspects of the disclosed systems and methods can be arranged and combined in a wide variety of different configurations.

Food packaging is mainly used to keep foods fresh to maintain a longer shelf life and is one of the largest factors in preventing food waste. Food waste is one of the biggest challenges that society faces as approximately 1.3 billion pounds of food is wasted every year, around one-third of all food produced. One of the biggest reasons that food is wasted is due to fungal growth. To prevent this waste, food packaging provides a barrier to undesirable external factors or conditions such as force, bacteria, chemicals, etc. The material must have good mechanical strength and be able to provide a barrier for the interior in order to protect bruising and a decrease in freshness. These properties allow for the interior to be safer and be of higher quality for the consumer.

In the past, petrochemical-based plastics such as polyethylene terephthalate (PET), polyvinylchloride (PVC), polyethylene have been widely used as packaging materials due to the low cost and versatility. They have good mechanical properties, provide a barrier to oxygen and carbon dioxide, and retain heat, among other properties. However, the problem arises in the fact that they are non-biodegradable and will inevitably contribute to the serious problem of plastic pollution.

Accordingly, a potential remedy to the pollution caused by plastic use worldwide is the development of next-generation materials that possess enhanced mechanical properties coupled with biodegradability. The development of such materials would allow for their utilization in single-use items, such as food packaging, and then for their disposal through natural means of bacterial and/or fungal breakdown.

Hydrogels have been investigated for their tissue-like mechanical strength, biocompatibility, hydrophilic nature, and flexibility. Due to their versatility, synthetic hydrogels have been popularized after their discovery in 1960, and are utilized in actuators for optics and fluidics, tissue engineering, and drug delivery. With growing amount of applications, these hydrogels can be engineered in a variety of ways by changing the crosslinking density or by tailoring the properties to have biodegradation and tough mechanical strength, with some having to bear or even generate mechanical forces. Recently, hydrogel films have been utilized as a food packaging material because of its unique mechanical properties.

In certain embodiments as otherwise described herein, the composition as otherwise describe herein comprises starch in an amount ranging from 15-45 wt % (e.g., 20-40 wt %), chitosan in an amount ranging from 1-50 wt % (e.g., 2-40 wt %), polyacrylamide in an amount ranging from 1-10 wt % (e.g., 2-8 wt %), and water in an amount ranging from 25-85 wt % (e.g., 30-80 wt %). In various other embodiments, the composition comprises starch in an amount ranging from 25-35 wt %, chitosan in an amount ranging from 4-20 wt %, polyacrylamide in an amount ranging from 3-5 wt %, and water in an amount ranging from 50-68 wt %.

The starch present in the present disclosure has a large impact on the properties of the final composition. As defined herein, starch is taken to mean any naturally abundant polysaccharide made out of two biopolymers, amylose and amylopectin, that form a semi-crystalline granular structure. Numerous starches are known in the art may be effectively utilized in the present disclosure. In certain embodiments as otherwise described herein, the starch is a rice starch, a wheat starch, a corn starch, a maize starch, a potato starch, a cassava starch, a tapioca starch, a waxy starch (e.g., a waxy corn starch or waxy potato starch), a soya bean starch, an arrowroot, a floridean starch, a dextrin, a cyclodextrin, an amylopectin, an amylose, a corn syrup, a cycloamylose, a dextrose equivalent, a dialdehyde starch, a distarch phosphate, a glucose syrup, a high-fructose corn syrup, a hydrogenated starch hydrolysate, a hydroxyethyl starch, a hydroxypropyl distarch, a phosphate hydroxypropyl starch, a Konnyaku, a Kudzu, maltitol, a maltodextrin, a maltrose, a pentastarch, a phosphate distarch phosphate, a resistant starch, a retrogradation starch, a Usi, or a Warabimochi. A large variety of other starches, starch derivatives, starch products, and, in general, polysaccharides, may be useful structural components in order to enhance structural properties, biodegradation, or other properties of interest. In certain embodiments as otherwise described herein, the starch is pregelatinized. In various other embodiments, the starch is not pregelatinized. In further embodiments, mixtures of starches are utilized. In certain embodiments as otherwise describe herein, the starch may be present in an amount from 26-35 wt %, or 27-35 wt %, or 28-35 wt %, or 29-35 wt %, or 30-35 wt %, or 31-35 wt %, or 32-35 wt %, or 25-32 wt %, or 26-32 wt %, or 27-32 wt %, or 28-32 wt % or 29-32 wt %, or 30-32 wt %, or 25-30 wt %, or 26-30 wt %, or 27-30 wt %, or 28-30 wt %, or 25-28 wt %.

Similarly, the amount of chitosan has been found to have a large effect on the strength and other properties of the final composition. Chitin, as defined herein, is highly insoluble N-acetylated polymer of $\beta$-(1,4)-D-glucosamine. Chitosan is an acid-soluble deacetylated form of chitin. Chitin is commonly found in exoskeletons of marine invertebrates and cuticles of insects. Chitosan can be obtained by N-deacetylating chitin obtained from crab or shrimp shells. Chitosan can also be obtained from the cell walls of a filamentous fungus of the family Mucoraceae. Chitosan is also understood herein to encompass related materials such as chitosan precursors (e.g., chitin) and cellulose materials (e.g., cellulose, cellulose esters, nitrocellulose, hemicellulose). In certain embodiments as otherwise described herein, the chitosan may be present in an amount ranging from 4-30 wt %, or 4-25 wt %, or 4-20 wt %, or 4-18 wt %, or 4-16 wt %, or 4-14 wt %, or 4-12 wt %, or 4-10 wt %, or 4-8 wt %, or 6-30 wt %, or 6-25 wt %, or 6-20 wt %, or 6-18 wt %, or 6-16 wt %, or 6-14 wt %, or 6-12 wt %, or 6-10 wt %, or 8-30 wt %, or 8-25 wt %, or 8-20 wt %, or 8-18 wt %, or 8-16 wt %, or 8-14 wt %, or 8-12 wt %, or 10-30 wt %, or 10-25 wt %, or 10-20 wt %, or 10-18 wt %, or 10-16 wt %, or 10-14 wt %.

Without wishing to be bound by theory, it is presently theorized that ionic interactions between starch granules and chitosan chains leads to a material with enhanced mechanical properties while maintaining biodegradability. Accordingly, it will be understood that the relative proportions of starch or chitosan in the material can be adjusted to enhance the properties of the final composition. Accordingly, in certain embodiments as otherwise described herein, the starch wt % in the composition is at most 400% of the chitosan wt %. For example, the starch wt % may be at most 300%, or at most 250%, or at most 200% (e.g., at most 150%) of the chitosan wt % of the composition. In other embodiments as otherwise described herein, the starch wt % present in the composition is at least 150% of the chitosan wt %, or at least 200%, or at least 250% (e.g., at least 300%, or at least 400%) of chitosan wt %.

The composition also comprises polyacrylamide. Poly-acrylamides are polymers that are formed from acrylamide monomers. Polyacrylamide may be used as a biodegradable polymer binder. As defined herein, polyacrylamide is taken to mean primary vinylamides including not only acrylamide itself but also substituted acrylamides such as methacrylam-ide, ethylacrylamide, crotonamide N-methyl acrylamide, N-butyl acrylamide, N-ethyl methacrylamide and the like. Thus, polyacrylamides, which by definition are polymers made from repeating acrylamide monomers, include repeat-ing units from at least some of these various compounds. Specifically, numerous acrylamide monomers that are com-monly used and can be provided, alone or in combination, include N,N—$(R^1)(R^2)$acrylamide, wherein $R^1$ and $R^2$ are independently selected from hydrogen, methyl, ethyl, iso-propyl, and butyl. Thus, in certain embodiments, the poly-acrylamide provided in the present disclosure may be a polyacrylamide with one or more hydrogen or alkyl sub-stituents bound to the subunit nitrogen. In other embodi-ments, the polyacrylamide comprises a simple terminated amine moiety (i.e., $R^1=R^2=$hydrogen of the acrylamide monomer). Accordingly, in certain embodiments as other-wise described herein, the polyacrylamide is present in an amount ranging from 1-10 wt % (e.g., 2-8 wt %). For Example, the polyacrylamide may be present in an amount ranging from 3-8 wt %, or 4-8 wt %, or 5-8 wt %, or 6-8 wt %, or 2-7 wt %, or 3-7 wt %, or 4-7 wt %, or 5-7 wt %, or 1-6 wt %, or 2-6 wt %, or 3-6 wt %, or 4-6 wt %, or 1-5 wt %, or 2-5 wt %, or 3-5 wt %, or 1-4 wt %, or 2-4 wt %.

Water is also a component of the composition and meth-ods as otherwise described herein. Water may be used as the reaction medium during the method of making, and may be incorporated into the final composition. As such, in certain embodiments as otherwise described herein, the balance of the composition wt % is water. In various embodiments, water is present in an amount ranging from 25-85 wt % (e.g., 30-80 wt %). For example, the water may be present in an amount ranging from 25-75 wt %, or 30-75 wt %, or 35-75 wt %, or 40-75 wt %, or 45-75 wt %, or 50-75 wt %, or 55-75 wt %, or 60-75 wt %, or 25-70 wt %, or 30-70 wt %, or 35-70 wt %, or 40-70 wt %, or 45-70 wt %, or 50-70 wt %, or 25-65 wt %, or 30-65 wt %, or 35-65 wt %, or 40-65 wt %, or 45-65 wt %, or 50-65 wt %.

Solution pH can have a large influence on reaction kinet-ics and the properties of the final composition. In certain embodiments as otherwise described herein, the pH of the water ranges between 4 and 10 (e.g., between 5 and 9, or between 6 and 8). For example, the pH may be essentially neutral (i.e., pH is about 7). In various other embodiments, the pH is slightly acidic (e.g., the pH ranges between 4 and 7, or between 5 and 7). In further embodiments, the pH is slightly basic (e.g., the pH ranges between 7 and 10, or between 7 and 9).

In certain embodiments as otherwise described herein, the composition further comprises a coating material on the surface of the composition. The coating material may serve several purposes, including improving the handling of the material, reducing water evaporation of the material, retarding or enhancing biodegradation, or tuning one or more property of the material (e.g., a mechanical property, such as tensile strength). Various suitable coating compositions are explicitly envisaged herein. In certain embodiments as oth-erwise described herein, the coating material comprises a humectant. Humectants are materials that reduce water evaporation from a hydrogel, preventing premature dehy-dration and subsequent loss of functionality of the material. Typically, but not exclusively, humectants have a strong affinity for water and attract and retain moisture from the air. This allows for delivery of moisture to the underlying substrate. A variety of humectants are known in the art, including sugar alcohols (e.g., glycerol, sorbitol, xylitol, maltitol), polyols (e.g., polydextrose, glycerin), sodium hex-ametaphosphate, carrageenan, pectin, aloe vera, hydrolyzed proteins, propylene glycol, polyethylene glycol, egg-based films, silicone-based polyols (e.g., PEG-9 dimethicone, PEG-12 dimethicone), agar, alginate, gelatin. Such materials can be provided alone or in combination, and may be incorporated into a matrix of another material. In certain embodiments as otherwise described herein, the coating material is comprised of at least one of a humectant, glycerol, gelatin, sorbitol, agar, alginate. The coating may be present in amounts ranging between 1-50 wt %, or 5-30 wt % (e.g., 10-20 wt %) of the entire composition. A represen-tative coating material includes 8% chitosan and 27% starch in the representative composite materials disclosed herein.

A variety of additives may be utilized to enhance the preparation conditions or the properties of the final product. In certain embodiments as otherwise described herein, the composition further comprises at least one of: an initiator, an accelerator, a crosslinker, and/or inorganic minerals. For example, the composition as otherwise described herein may further comprise all of an initiator, an accelerator, and a crosslinker.

Initiators are common components of polymerization reactions and serve to assist to initiate the reaction. Initiators are especially common in radical polymerization reactions. An example initiator is ammonium persulfate. In general, a wide variety of initiators are known in the art and may be employed according to the present disclosure. Most com-monly, initiators are, halogens, peroxides, or azo species. Often such species undergo undergo hemolytic cleavage to generate radicals in situ, although initiators with other mechanisms may be used as described herein. Examples include di-tert-butyl peroxide, benzoyl peroxide, methyl ethyl ketone peroxide, acetone peroxide, or peroxydisulfates (e.g., ammonium persulfate, potassium persulfate, sodium persulfate). Suitable amounts of initiator may range between 0.01-2 wt %, 0.1-1 wt %, or 0.2-0.6 wt %.

Accelerators serve to increase the reaction rate, for example, in a polymerization reaction. An accelerator may be added at the beginning of a reaction to decrease the necessary reaction time, or may be added at the end (e.g., after a blending step) to allow a final polymerization reac-tion to happen quickly (e.g., to "set" the composition). An example of a suitable accelerator is N,N,N',N'-tetramethyl-enediamine, although a wide variety of accelerators are known in the art and may be applied according to the present disclosure Suitable amounts of accelerators may range between 0.001 wt %-1 wt %, or 0.005 wt % to 0.5 wt %, or 0.01 wt % to 0.1 wt.

Cross-linkers are compounds that serve to link adjacent polymer strands. The use of a cross-linker can substantially modify the properties of a material, often through increasing toughness the material and average molecular weight of the polymer by increased covalent bonds in directions largely orthogonal to the polymer chain. For example, the composition or method as otherwise described herein may include methylenebisacrylamide. Other suitable crosslinkers may be selected based upon the specific needs of the polymer employed as may be determined by one of skill in the art according to the present disclosure. Suitable amounts of crosslinker added to the reaction may range between 0.01 wt % to 10 wt %, or 0.02 wt % to 5 wt %, or 0.02 wt % to 0.5 wt %.

Other additives that may be compatible with the goal of biodegradability are inorganic minerals. Such minerals may serve to enhance the mechanical or physical properties, or act as inexpensive filler to lower the production cost of the material. Examples of inorganic minerals suitable for use in the composition as otherwise described herein are carbonates, halides, sulfides, or oxides of alkali metals, alkaline earth metals, or transition metals. Specific examples include calcium carbonate, silica, calcium sulfate, calcium sulfate hydrate, magnesium silicate, micaceous minerals, clay minerals, titanium dioxide, or talc. Suitable amounts of inorganic mineral additives may range between 7-17 wt %, 5-20 wt %, or 1-25 wt %.

It will be further understood that the selected polymer may be cross-linked or uncross-linked, and the degree of cross-linking can be controlled by one of skill in the art in light of this disclosure.

In certain embodiments as otherwise described herein, the composition can exhibit an exothermic phase transition between 150° C. and 210° C. (e.g., between 170° C. and 200° C.). The phase transition temperature can be defined by the peak of the exotherm observed via differential scanning calorimetry. Similarly, in certain embodiments as otherwise described herein, the composition can exhibit a decomposition temperature around 150° C. to 250° C.

Accordingly, in certain embodiments as otherwise described herein, the composition exhibits a maximum tensile strength between 100 and 140 kPa as measured by standard tensile testing techniques. For example, the maximum tensile strength may range between 110 and 130 kPa, or between 115 and 125 kPa. In various embodiments, the maximum tensile strength may be greater than 100 kPa, or greater than 110 kPa, or greater than 120 kPa. Another important mechanical attribute is the Young's modulus. In certain embodiments as otherwise described herein, the Young's modulus may range between 90 and 150 kPa (e.g., between 100 and 140 kPa, or between 90 and 110 kPa). Similarly, the composition as otherwise described herein may have a toughness over 7 MJ/mm³. The toughness may range between 6 and 10 MJ/mm³, or between 7 and 10 MJ/mm³, e.g., between 7.5 and 9 MJ/mm³ or between 8 and 9 MJ/mm³. In various embodiments, the toughness is over 8 MJ/mm³, or over 9 MJ/mm³, or over 10 MJ/mm³.

An aspect of the disclosure as otherwise described herein is a method of making a composition, comprising: admixing 15-45 wt % starch with 25-85 wt % water to form a first mixture; admixing 1-10 wt % acrylamide, an initiator, and a crosslinker with the first mixture to form a second mixture; admixing 1-20 wt % chitosan with the second mixture to form a suspension; stirring the suspension for at least 24 hours (e.g., for 24 hours, or for 36 hours, or for 48 hours) at room temperature; adding an accelerator to the suspension and stirring the suspension for 2-4 minutes to form a partially polymerized hydrogel, wherein the amount of accelerator is sufficient to accelerate polymerization of the suspension; and casting the hydrogel and allowing the hydrogel to fully polymerize. The starch, water, acrylamide, initiator, crosslinker, accelerator, and water may be described elsewhere. In particular embodiments as otherwise described herein, the starch is a rice starch.

In the first step, the starch may be admixed with water. The mixing can be done by hand, or by a mechanical mixer, or through a magnetic stir bar. Suspending the starch in water allows the starch to fully hydrate prior to the polymerization reaction. After admixing the polymer precursors and chitosan, the resulting suspension may be covered and stirred for at least 24 hours, in some cases for up to 48 hours, in order for the chitosan to fully disperse into the starch granules. The interactions between the chitosan and starch are mainly kinetically induced and need sufficient time to fully occur. After this mixing time, the viscosity of the suspension should still be low enough to be pourable. After the addition of the accelerator and subsequent mixing for 1 minute the final polymerization of the suspension should occur. This allows the suspension to be cast into acrylic molds, allowing the creation of materials of nearly any shape. For example, casting into a 3D printed Kirigami mold was used in an example embodiment for impact testing. The samples may be left to polymerize for at least an hour before removal. After final polymerization, the material may be sensitive to dehydration and should be coated or otherwise covered or protected to prevent premature degradation.

Certain compositions have been surprisingly found to possess desirable mechanical properties combined with biodegradability. Accordingly, these materials are exceptionally suitable for use for packaging materials, which are often single-use. Accordingly, an aspect of the present disclosure is a packaging material comprising the composition as otherwise described herein. The packaging material may further comprise a coating material as otherwise described herein, or may possess a second coating material that is not the same as the first coating material. The second coating material may serve to enhance the use of the composition as a component of the packaging material. The coating material may be a humectant, glycerol, gelatin, sorbitol, or agar.

EXAMPLES

X-Ray Near-Field Coherent X-Ray Scattering

Analysis was performed at station 7-ID-B of Advanced Photon Source, Argonne National Laboratory. An undulator A with a gap of 70 mm produces X-ray beams with a first harmonics energy at 14.026 keV. A 1 mm×1 mm beam defining slit was placed 1.5 m upstream of the sample to select the portion of the X-ray beam with the highest intensity. The flux at the sample is approximately $1\times10^{13}$ photon/s. A YAG crystal scintillator was placed 20 mm downstream of the sample at a 45° angle with the incoming beam direction to convert the near-field X-ray speckle patterns to visible light speckles. A 10×Mitutoyo objective lens was placed perpendicular to the X-ray beam direction and was aligned so that the visible light speckles on the YAG crystal was within the depth of field of the objective lens, and the speckle patterns were collected using a custom-designed high-speed CCD camera with maximum frame rate of 20 kHz.

Two Pilatus X-ray detectors (Dectris Ltd, Switzerland), Pilatus 2M for SAXS and 300K for WAXS, were used for simultaneous SAXS/WAXS measurements. The sample-to-detector distances were set to cover the scattering momentum transfer, q, from 0.005 to 2.7 Å⁻¹ without gap. The exposure time was set in the range of 0.5-1.0 s to achieve a good signal-to-noise ratio but without detectable radiation damages. The q value calibration was performed using silver behenate prior to measurements. The isotropic 2-D images were converted to 1-D scattering profiles using the Matlab software package developed at the beamline. A Linkam THMS600 heating/cooling stage (Linkam Scientific, UK) was used for the in situ heating experiments. The temperature accuracy is within ±0.1° C. The SAXS/WAXS data were taken 5 minutes after the heater reaches the set temperature. Water swelling experiments were carried out as the following: starch and starch/chitosan hybrid gel (dry) was put in a quartz capillary of 2 mm diameter; the X-ray beam was put about 1 mm below the top position of the sample, in such way that water added from the top would have good contact with the sample; water was added using a syringe pump which was controlled remotely. SAXS/WAXS data collection was started immediately after adding water to the starch sample.

X-Ray Sample Preparation

Samples were created for x-ray phase contrast imaging by synthesizing two groups (suspension, hydrogel) of three different samples following the stoichiometry as described above but omitting any acrylamide, initiator, crosslinker, or accelerator. The samples were vigorously mixed and injected into a capillary tube. X-ray imaging was performed at Sector 7-ID and 8-ID beamlines using either polychromatic or monochromatic x-rays.

Cryogenic Scanning Electron Microscope (Cryo-SEM)

Cryo-SEM was used to produce images of the hydrogel samples by scanning the fractured surface with a focused beam of electrons. The samples were freeze-dried, fractured, and coated with an ultrathin layer of Pt/Pd.

Sample Impact Analysis

Impact testing was conducted with a trebuchet. Kirigami molds were 3D printed with a thickness of 4 mm. Plastic spheres of 4 mm were wrapped in the samples and the trebuchet used to launch the balls. The impact of the ball was recorded against a chalkboard, and frame by frame analysis was used to calculate the horizontal vectors of incident velocity and recoil velocity.

Differential Scanning Calorimetry

Differential scanning calorimetry was conducted using TA Discovery DSC 2500 with 3-5 mg samples. The heating and cooling rate was 10° C./min from room temperature to 250° C.

Mechanical Testing

Samples were cast in dogbone-shaped molds for mechanical testing following ASTM standard ($50 \times 10 \times 6$ mm³). Tensile tests were conducted at room temperature with controlled humidity using a ZwickRoell zwickiLine Z0.5 (100 N loading cell). Samples were stretched at a speed of 75 mm/min until failure.

Compression testing was used with cube molds (20 mm×20 mm×20 mm). Each sample was loaded into a ZwickRoell zwickiLine Z0.5 (100 N loading cell) with two flat plates inserted into the clamps. The samples were compressed until failure or until the max force of the machine, 520 kPa. Hysteresis tests were conducted by setting the max engineering strain to 60%. The speed of compression was 500 mm/min. For rate dependence, the speed of compression was varied from 2.5 mm/min to 50 mm/min.

Biodegradation Testing

Dog bone casting molds were created as described above. Samples were left inside a parafilm sealed petri dish and monitored for ten days. Sample films measuring $70 \times 70 \times 1.5$ mm³ were prepared and cut into star shapes. The biodegradation properties were tested by burying the samples under 5 inches of MiracleGro™ All-Purpose Soil. The humidity and temperature (25° C.) were kept stable and the soil watered with 15 mL of distilled water every other day. Before imaging, the samples were soaked in distilled water for 15 minutes and rinsed clean to remove the soil. Holes and color change were observed, and pictures taken in 1-month intervals.

Example 1: Synthesis of Samples 1-5

To explore the effects of different stoichiometry on mechanical properties, a number of compositions were synthesized according to the generalized procedure: Rice starch (50 g) and sterilized water (110 g) were combined and then acrylamide, the crosslinker methylenebisacrylamide, and initiator ammonium persulfate were added. Chitosan was then added in varying amount from 1.75 wt % to 8.17 wt % and the suspension stirred for 48 hours with temperature stabilized at 25° C. in a controlled humidity environment. After stirring, the accelerator N,N,N',N'-tetramethylethylenediamine (TEMED) was added and the suspension stirred or 2-4 minutes. The suspension was subsequently poured into acrylic molds and sealed with acrylic cover slide to allow for polymerization to occur. After 1-3 hours, polymerization was essentially complete. The samples were wrapped in parafilm and aluminum foil to minimize moisture loss. The samples prepared are enumerated in the table below:

| | Chitosan (wt %) | Rice Starch (wt %) | Water (wt %) | Acrylamide (wt %) | MBAA + APS (wt %) |
|---|---|---|---|---|---|
| Sample 1 | 1.75 | 29.14 | 64.10 | 4.66 | 0.35 |
| Sample 2 | 3.44 | 28.64 | 63.00 | 4.58 | 0.34 |
| Sample 3 | 5.07 | 28.15 | 61.94 | 4.50 | 0.34 |
| Sample 4 | 6.64 | 27.69 | 60.91 | 4.43 | 0.33 |
| Sample 5 | 8.17 | 27.23 | 59.91 | 4.36 | 0.33 |

Example 2: Synthesis of Comparative Samples 1-3

Comparative Samples 1-3 were synthesized according to the sample procedure as Sample 1-5 except one or both of rice starch and chitosan was omitted. The Comparative Samples were prepared with proportions below:

| | Chitosan (wt %) | Rice Starch (wt %) | Acrylamide (wt %) | Water (wt %) | MBAA + APS (wt %) |
|---|---|---|---|---|---|
| Comparative Sample 1 | 11.23 | — | 5.99 | 82.34 | 0.45 |
| Comparative Sample 2 | — | 29.66 | 4.74 | 65.24 | 0.36 |

-continued

| | Chitosan (wt %) | Rice Starch (wt %) | Acrylamide (wt %) | Water (wt %) | MBAA + APS (wt %) |
|---|---|---|---|---|---|
| Comparative Sample 3 | — | | 6.75 | 92.75 | 0.51 |

Example 3: Mechanical Testing

Testing results of the above samples are summarized below:

| Sample | Chitosan (wt %) | Max Tensile | Young's Modulus | Phase Change | Toughness | Energy Dissipation |
|---|---|---|---|---|---|---|
| 1 | 1.75 | 95 kPa | 16 kPa | | | |
| 2 | 3.44 | 101 kPa | 30 kPa | | | |
| 3 | 5.07 | 103 kPa | 37 kPa | | | |
| 4 | 6.64 | 110 kPa | 61 kPa | | | |
| 5 | 8.17 | 120 kPa | 97 kPa | 187° C. | 8.5 MJ/mm$^3$ | 1650 kPa |
| Comparative Sample 1 | 11.23 | 49 kPa | 21 kPa | 172° C. | 3.2 MJ/mm$^3$ | 290 kPa |
| Comparative Sample 2 | — | 87 kPa | 11 kPa | 182° C. | 5.8 MJ/mm$^3$ | 120 kPa |
| Comparative Sample 3 | — | | | | | |

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

We claim:

1. A biodegradable polymerized hydrogel composition, comprising:
   starch in an amount ranging from 15-45 wt %;
   chitosan in an amount ranging from 1-50 wt %;
   polyacrylamide in an amount ranging from 1-10 wt %; and
   water in an amount ranging from 25-85 wt %; and
   at least one of an initiator, an accelerator, and a crosslinker.

2. The composition of claim 1, comprising:
   starch in an amount ranging from 25-35 wt %;
   chitosan in an amount ranging from 4-20 wt %
   polyacrylamide in an amount ranging from 3-5 wt %; and
   water in an amount ranging from 50-68 wt %.

3. The composition of claim 1, further comprising a coating material on a surface of the composition.

4. The composition of claim 3, wherein the coating material is comprised of a humectant, glycerol, gelatin, sorbitol, and agar.

5. The composition of claim 1, further comprising an initiator, an accelerator, and a crosslinker.

6. The composition of claim 1, wherein the starch is selected from a rice starch, a wheat starch, a com starch, a maize starch, a potato starch, a cassava starch, tapioca starch, a waxy corn starch, a soya bean starch, a waxy potato starch, a floridean starch, a dextrin, a cyclodextrin, an amylopectin, an amylase, an arrowroot, a corn syrup, a cycloamylose, a dextrose equivalent, a dialdehyde starch, a distarch phosphate, a glucose syrup, a high-fructose corn syrup, a hydrogenated starch hydrolysates, a hydroxyethyl starch, a hydroxypropyl distarch, a phosphate hydroxypropyl starch, a Konnyaku, a Kudzu, a maltitol, a maltodextrin, a maltose, a pentastarch, a phosphated distarch phosphate, a resistant starch, a retrogradation (starch), an Usi (food), and a Warabimochi.

7. The composition of claim 1, wherein the chitosan comprises one or more of chitosan, chitin, and cellulose.

8. The composition of claim 1, wherein the starch is not pregelatinized and/or wherein the water has a pH between 6 and 8.

9. The composition of claim 1, wherein the water is at essentially neutral pH.

10. The composition of claim 1, wherein the composition exhibits an exothermic phase transition at a greater temperature than both the starch alone and the chitosan alone.

11. The composition of claim 1, wherein the composition exhibits an exothermic phase transition between 150° C. and 210° C., wherein the composition exhibits a maximum tensile strength between 100 and 140 kPa, wherein the composition exhibits a Young's modulus of between 90 and 110 kPa, and/or wherein the composition has a toughness between 6 and 10 MJ/mm$^3$.

12. The composition of claim 1, wherein the composition exhibits a toughness over 7 MJ/mm$^3$.

13. The composition of claim 1, wherein the initiator is ammonium persulfate.

14. The composition of claim 1, wherein the crosslinker is methylenebisacrylamide.

15. The composition of claim 1, wherein the accelerator is N,N,N',N'-tetramethylethylenediamine (TEMED).

16. The composition of claim 1, wherein the composition is partially polymerized.

17. A method of packaging, comprising:
   providing the composition of claim 1;
   forming a packaging material comprising the composition.

18. The method of packaging of claim 17, further comprising:
   using the packaging material to package a food item.

19. A packaging material comprising the composition of claim 1, and a coating material on the surface of the composition.

20. The packaging material of claim 19, wherein the coating material is comprised of a humectant, glycerol, gelatin, sorbitol, and agar.

* * * * *